United States Patent [19]
Bunger et al.

[11] Patent Number: 5,601,315
[45] Date of Patent: Feb. 11, 1997

[54] MOLDED CONNECTOR FOR BRANCH CONNECTIONS FOR A PIPELINE

[75] Inventors: Lars Bunger; Helmut Hilger, both of Schaffhausen, Switzerland

[73] Assignee: Georg Fischer Rohrleitungssysteme AG, Schaffhausen, Switzerland

[21] Appl. No.: 418,204

[22] Filed: Apr. 7, 1995

[30] Foreign Application Priority Data

Apr. 29, 1994 [CH] Switzerland .......... 1 338/94

[51] Int. Cl.⁶ .................................... F16L 13/02
[52] U.S. Cl. .................. 285/21.2; 285/24; 285/184; 285/197; 285/423
[58] Field of Search ............... 285/21, 24, 184, 285/197, 423

[56] References Cited

U.S. PATENT DOCUMENTS

| | | | |
|---|---|---|---|
| 3,943,334 | 3/1976 | Sturm | 285/21 X |
| 3,987,276 | 10/1976 | Vogelsanger et al. | 285/21 X |
| 4,455,482 | 6/1984 | Grandclement | 285/21 X |
| 4,624,487 | 11/1986 | Thalmann | 285/21 X |
| 4,825,534 | 5/1989 | White et al. | 285/21 X |
| 4,894,521 | 1/1990 | Evans | 285/21 X |
| 5,104,468 | 4/1992 | Jong | 285/21 X |

FOREIGN PATENT DOCUMENTS 3929326  3/1991  Germany .......... 285/21

*Primary Examiner*—Dave W. Arola
*Attorney, Agent, or Firm*—Bachman & LaPointe, P.C.

[57] ABSTRACT

A molded connector for producing a branch connection for a pipeline has two heating windings which are connected to each other and by means of which the weld connection between the pipeline and the molded connector as well as the inserted molded branch part or a pipe is produced simultaneously.

6 Claims, 3 Drawing Sheets

MOLDED CONNECTOR FOR BRANCH CONNECTIONS FOR A PIPELINE

BACKGROUND OF THE INVENTION

The present invention relates to a molded connector of plastic for producing branch connections for a plastic pipeline.

Federal Republic of Germany A1-22 08 862 discloses a molded connector of the aforementioned type the molded branch part of which is connected, adjacent its end, to the pipe socket by means of an arc-welding sleeve. Its large structural height is disadvantageous, since the branch socket for the branch line can only be arranged above the welding sleeve. Furthermore, the two separate heating windings have four terminals and two separate weldings are necessary in order to produce the connection.

The molded connector shown in Federal Republic of Germany C1-40 12 297 also has two separate heating elements, each provided with two terminals, the heating elements being developed as a disk wrapped with resistance wire. The flange-shaped connection between the saddle-shaped part and the branch pipe requires a large amount of material on both of the parts, so that the connection can be very expensive to produce.

SUMMARY OF THE INVENTION

It is the principal object of the present invention to create a molded connector of the aforementioned type which has only a few components and which is of small structural height and to which a pipe branch can be produced easily and rapidly on a pipeline.

The foregoing object is achieved in accordance with the invention wherein a plastic molded connector for use in connecting a plastic branch pipe on a plastic pipeline comprises a saddle part portion and a pipe socket portion, the saddle part portion having a curved inner surface provided with a first electric heating winding for contacting and partially surrounding the plastic pipeline and the pipe socket portion having an inner surface defining an opening for receiving a plastic branch pipe provided with a second selective heating winding on the inner surface for contacting the plastic branch pipe wherein the first and second electric heating windings are connected together to form a welding element.

BRIEF DESCRIPTION OF THE DRAWINGS

Embodiments of the invention are shown in the accompanying drawings and will be described below. In the drawings.

DETAILED DESCRIPTION

Figure 1:
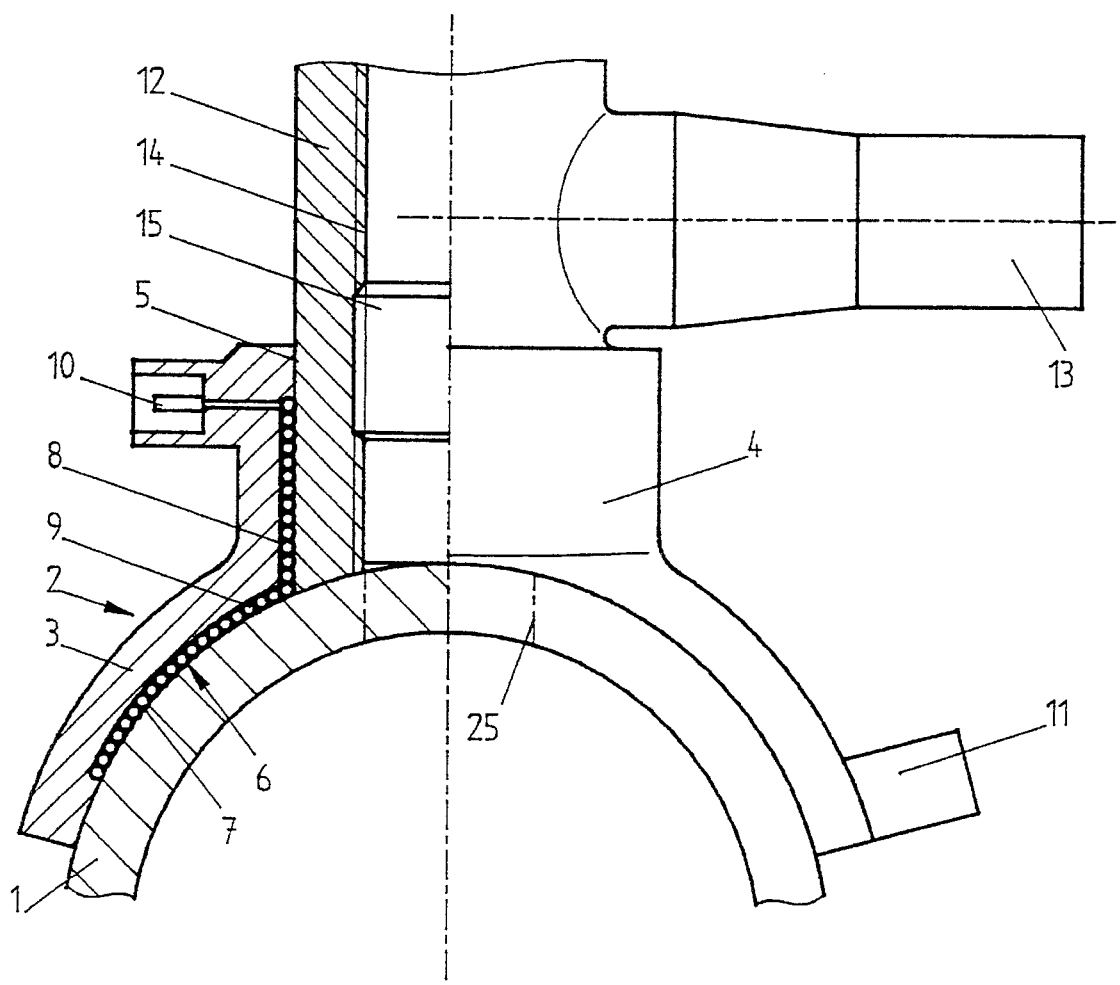
FIG. 1 is a view, partially in cross section, of a molded connector having a molded branch part which has a pipe drill.

FIG. 1 shows a molded connector 2 of plastic which is placed on a plastic pipeline 1 and consists of a saddle part 3 and a pipe socket 4, both of which parts are provided with a passage opening 5. The molded connector 2 has a welding element 6 which consists of a first heating winding 7 on the inner contour of the saddle part 5 and of a second heating winding 8 on the inner periphery of the pipe socket 4. The two heating windings 7, 8 are preferably made from one length of resistant wire 9 and thus form the single welding element 6. The two heating windings 7, 8 could also be made of separate resistance wires 9, in which case the two wires are connected to each other. The first heating winding 7 is wound spirally, extending from an outer diameter up to an inside diameter corresponding to the passage openings 5, a square or some other form of winding also being possible rather than a round winding. The second heating winding 8 is connected to the inner end of the first heating winding 7 in the form of a cylindrical winding the turns of which are arranged one above the other perpendicular to the first heating winding 7.

The outer end of the first heating winding 7 and the upper end of the second heating winding 8 are attached to plug-type terminals 10, 11, to which a welding device can be connected.

In the case of the embodiment of the welding element 6 shown in FIG. 1, the embodiment consists of a plastic-jacketed resistance wire 9 the turns of which lie close to each other and are preferably connected to each other by welding, as a result of which a compact welding element 6 is obtained. Upon the production of the molded connector 2 by injection molding, the welding element 6 is inserted into the injection mold, so that, upon the injection of the plastic into the mold, an integral attachment of it to the welding element 6 is produced and the welding element is embedded in the molded connector. A molded branch part 12 is inserted into the molded connector 2 and is attached to the latter by welding. The molded branch part 12 has, in known manner, a branch socket 13 for a branch pipeline which is to be attached as well as a pipe drill 15 which is screwed in an internal thread 14.

In order to produce a fluid-tight branch connection to the pipeline 1, the molded connector 2 is put on the place which is to be drilled and is held fast on the pipe by clamping means, such as, for instance, clamping straps. The molded branch part 12 is inserted into the molded connector 2 and is aligned with the branch socket 13 in accordance with the direction of attachment. The welding device is then connected to the plug-type connections 10, 11 and a fluid-tight weld connection, on the one hand, to the pipeline 1 and, on the other hand, to the molded branch part 12 is produced simultaneously by heating the two heating windings 7 and 8. After the connection of the branch line, an opening 25 is produced in known manner by means of the pipe drill 15 in the pipeline 1 which is under fluid pressure and in this way the flow into the branch line is produced.

Figure 2:
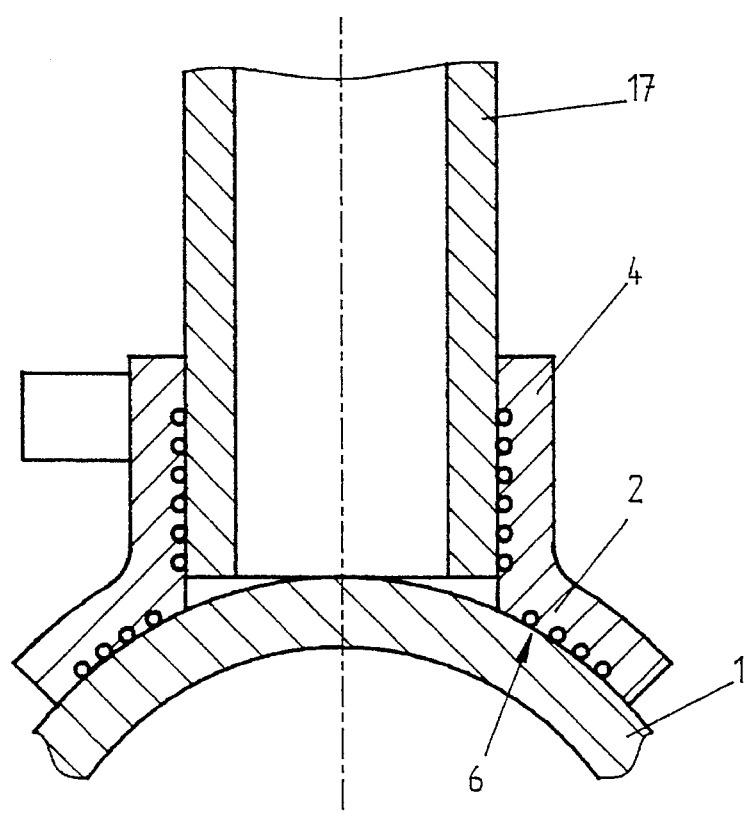
FIG. 2 is a cross section through a molded connector with a branch pipe welded therein.

In accordance with FIG. 2, the molded connector 2 is used for the direct production of a branch connection, a pipe 17 being inserted into the molded connector 2 and the welded attachment being produced in the manner described in FIG. 1.

Figure 3:
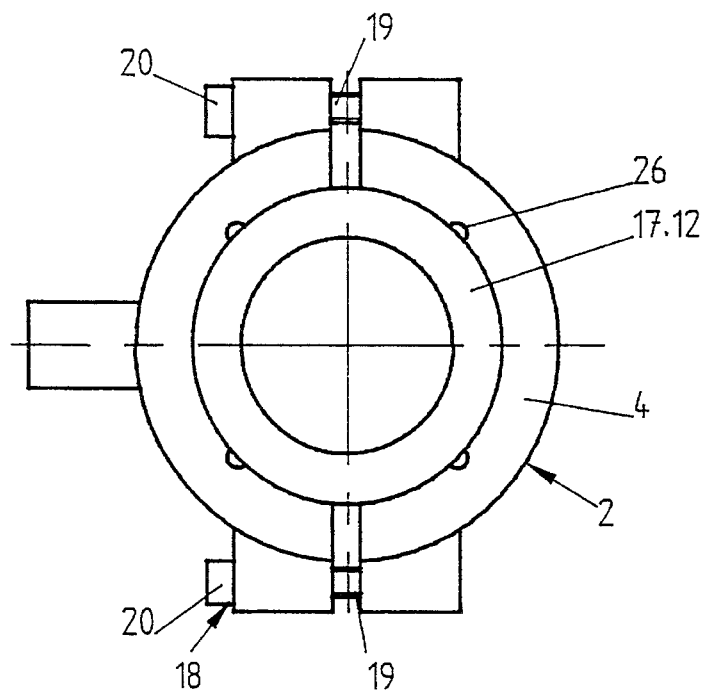
FIG. 3 is a top view of FIG. 2.

In order that the molded branch part 12 (FIG. 1) or the pipe 17 (FIG. 2) can be fixed in position before the welding, the connecting part 2, as can be noted from FIG. 3, has a clamping device 18 on the end of the pipe socket 4. This clamping device consists, for instance, of slots 19 arranged on the pipe socket 4 and screws 20 or a clamping strap, by means of which the inserted molded branch part 12 or the pipe 17 is firmly clamped.

In order that the branch socket 13 of the molded branch part 12 can be inserted and welded in a predetermined angular position, such as, for instance, 0° or 90°, with respect to the longitudinal axis of the pipeline, positioning means 26 are provided on the pipe socket 4 of the molded connector 2, said means consisting, for instance, of grooves on the pipe socket 4 and a projection or ledge on the molded branch part 12.

Figure 4:
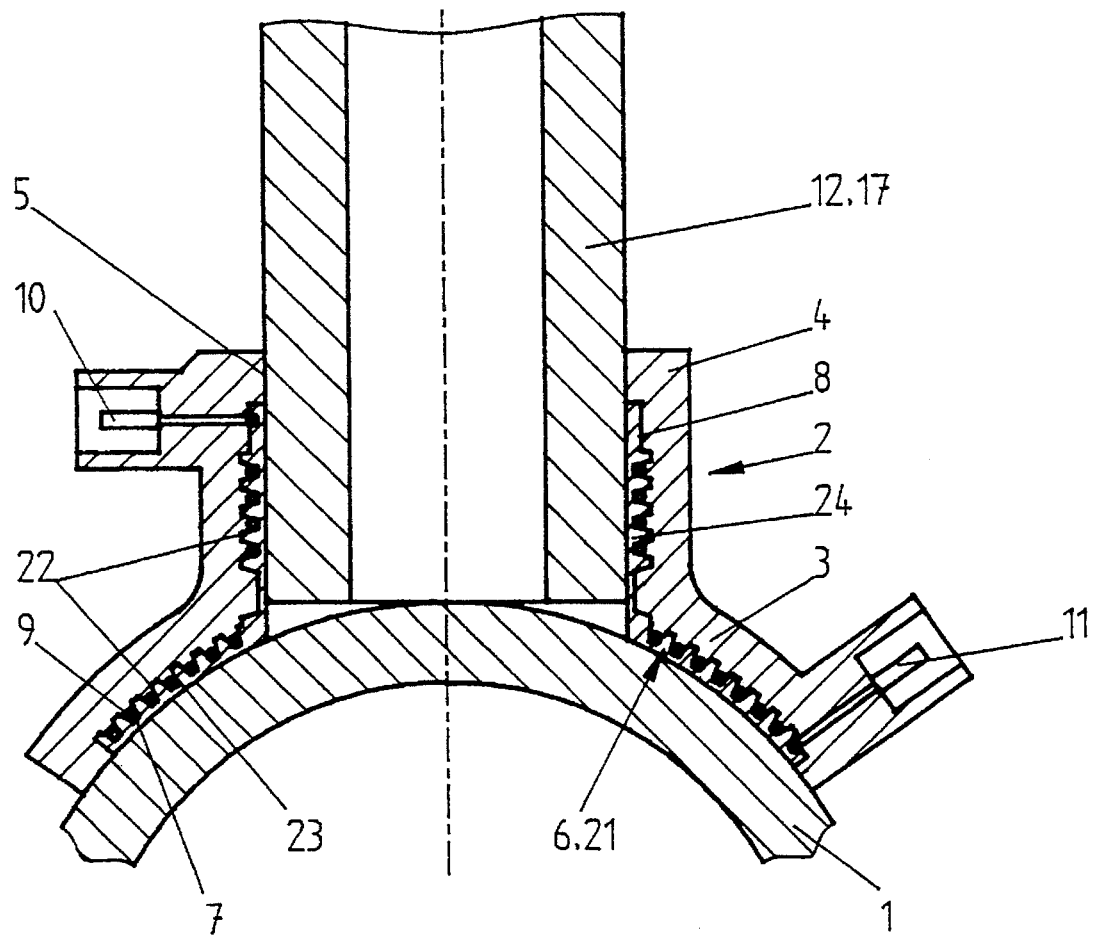
FIG. 4 is a section through a molded connector with a different embodiment of the welding element.

FIG. 4 shows a connector part 2 with a different embodiment of the welding element 6, it consisting of a winding support 21 of plastic and a bare resistance wire 9 inserted into grooves 22.

The winding support 21 has a saddle-shaped portion 23 which receives the first heating winding 7 and a cylindrical portion 24 which receives the second heating winding 8 and has the passage opening 5.

The winding support 21, wound with the resistance wire 9, is inserted into the mold, as already described, before the injection of the molded connector 2, so that the heating windings 7, 8 are entirely embedded in plastic after the injection.

The advantage of this variant embodiment resides in the fact that a bare resistance wire can be used and that the weld connecting surfaces are smooth so that there is no formation of craters and a better weld can be obtained.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A plastic molded connector for use in connecting a plastic branch pipe on a plastic pipeline comprises a saddle part portion and a pipe socket portion, said saddle part portion having a curved inner surface provided with a first electric heating winding for contacting and partially surrounding said plastic pipeline and said pipe socket portion having an inner surface defining an opening for receiving a plastic branch pipe provided with a second selective heating winding on said inner surface for contacting said plastic branch pipe wherein said first and second electric heating windings are connected together to form a welding element, wherein each end of the welding element forms a connection for a welding apparatus so that a weld can be produced simultaneously between saddle part and pipeline as well as between pipe socket and the branch pipe, and wherein said saddle part portion has an outer diameter and an inner diameter defined by said inner surface of said pipe socket portion and said first heating winding is spirally wound proceeding from the outer diameter to the inner diameter and the second heating winding is a cylindrical winding on said inner surface substantially perpendicular to said first heating winding, said pipe socket portion includes clamping means mounted thereon for clamping said pipe socket portion to said plastic branch pipe.

2. A molded connector according to claim 1 wherein said welding element consists of a plastic-jacketed resistance wire wound in turns such that the turns contact each other.

3. A molded connector according to claim 1 wherein said welding element consists of a winding support of plastic having a bare resistance wire arranged in grooves on the inner surfaces of the saddle part portion and pipe socket portion.

4. A molded connector according to claim 1 wherein said heating element is embedded in the molded connector.

5. A molded connector according to claim 1 wherein positioning means by which the branch pipe can be orientated at a predetermined angular position, to the longitudinal axis of the plastic pipeline are arranged on the pipe socket portion.

6. A molded connector according to claim 1 wherein both heating windings are made of a single-piece resistance wire.

* * * * *